H. GILLE.
VALVE FOR HYDRAULIC MACHINES.
APPLICATION FILED JUNE 24, 1914.
1,157,215.  Patented Oct. 19, 1915.
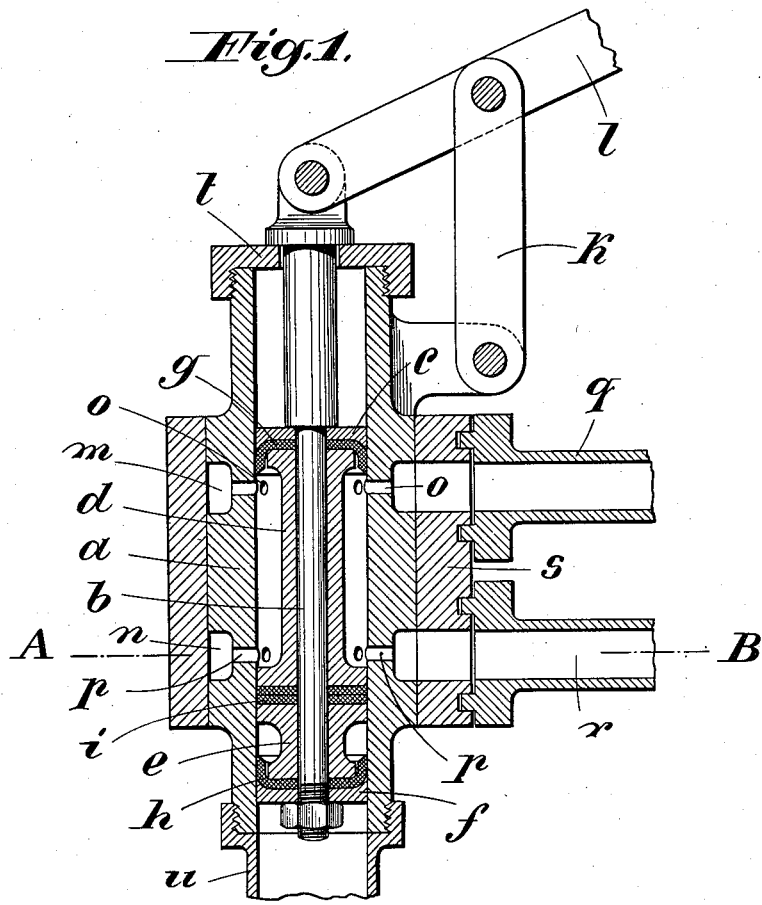
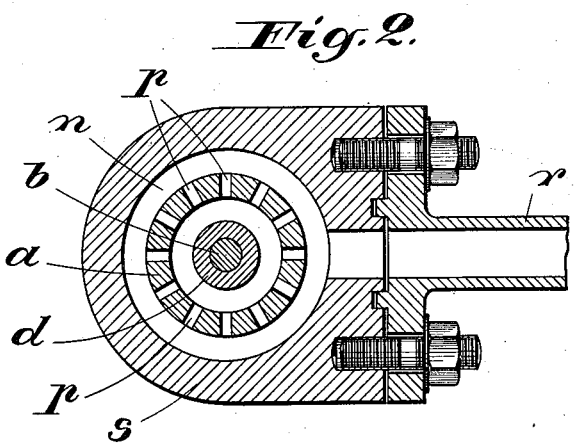
Witnesses
John Herr
V. P. Bostwick
Inventor.
Hugo Gille

UNITED STATES PATENT OFFICE.

HUGO GILLE, OF HUCKINGEN-ON-THE-RHINE, GERMANY.

VALVE FOR HYDRAULIC MACHINES.

1,157,215.  Specification of Letters Patent.  Patented Oct. 19, 1915.

Application filed June 24, 1914. Serial No. 847,150.

*To all whom it may concern:*

Be it known that I, HUGO GILLE, of Huckingen-on-the-Rhine, Kingdom of Prussia, German Empire, a subject of the King of Prussia, and whose post-office address is 39 Schulz Knaudtstrasse, Huckingen-on-the-Rhine, Kingdom of Prussia, German Empire, have invented new and useful Improvements in Valves for Hydraulic Machines, of which the following is a specification.

This invention relates to a controlling apparatus for hydraulic machines such as shears, presses, punches, swages, etc., which is adapted to control the water under pressure entering and leaving the machine; and in which apparatus the controlling piston is packed by packing collars in accordance with the high pressure employed, the said packing collars being pressed by the pressure against the cylinder wall. When these packing collars pass over the passage openings through which the water passes, the collar edge will be pressed into the opening by the water passing out of the controlling cylinder and consequently destruction of the packing collars and a tearing thereof takes place, which involves a loss of water under pressure due to the leakage. The necessity of frequently replacing the packing collars is therefore the result. In order to obviate this drawback, the controlling apparatus, according to the present invention, is characterized by the distinctive feature that in front of that packing collar which establishes the connection of the hydraulic pipe with the operating cylinder of the machine, a protecting device of one or several pistons is inserted, which considerably restricts the flow of the water under pressure when the packing collar passes the passage openings. The packing piston proper namely the collar piston is thereby relieved from the above-mentioned action of the water passing through under strong pressure. The edge of the collar is no longer pressed into the openings and the life of these packing collars is as long as that of those which have only to pass the smooth cylinder wall without passage openings. The protecting piston is not a packing piston and therefore need not have a collar packing pressed by the water under pressure but can be provided with a packing of any suitable kind, which in itself would not suffice for high pressure packing, but is sufficient to considerably decrease the strong current of the water under high pressure and to protect the packing collar of the packing piston proper against tearing.

A construction according to this invention is illustrated in the accompanying drawing, in which—

Figure 1 is a longitudinal section, and Fig. 2 a cross-section on the line A—B in Fig. 1.

The controlling apparatus comprises a cylinder $a$, a piston $d$ on a rod $b$, the collar holders $c$, $d$, $e$, $f$ for the packing collars $g$, $h$ of leather or other suitable elastic and tough material. A protecting piston is inserted in front of the lower packing piston $e$, $f$, $h$ and comprises a disk packing $i$ of leather, metal or other suitable material.

The piston is connected to a lever $l$ which is linked to the cylinder by a rod $k$. The cylinder has annular passages $m$ and $n$, which communicate through a ring of openings $o$ and $p$ with the water pipe $q$ and with the connecting pipe $r$ leading from the controlling apparatus to the machine. In order to assist a manipulation and boring the holes of the cylinder externally, this cylinder is mounted in the usual manner in the casing $s$ which is connected to the cylinder by shrinking, pressing or the like.

Fig. 1 shows that position of the controlling piston which allows water under pressure to pass through the pipe $q$ through the annular slot $m$, the holes $o$, the cylinder $a$, the openings $p$, the annular slot $n$, and the connecting pipe $r$ into the operating cylinder of the machine. For reversing, namely cutting off the water under pressure from the machine, the controlling piston is moved upward and the protecting piston $i$ passes the openings $p$, whereby the flow of the water out of the pipe $q$ into the pipe $r$ is considerably decreased so that when the lower packing piston with its collar $h$ passes over the openings $p$, the flow of water under pressure through the openings $p$ ceases. After passing the lower packing piston, the water under pressure passes out of the operating cylinder into the pipe $u$. During the return movement of the controlling piston into the position shown in Fig. 1, the collar $h$ of the lower packing piston will again be protected by the protecting piston $i$ when passing over the openings $p$, the full flow of the water under pressure being rendered possible by the protecting piston $i$ passing over the opening $p$. According to the construction illustrated, the arrangement of a protecting piston is unnecessary for the upper packing collar $g$, because it never passes over the openings $o$. If, however, the controlling apparatus is not adapted, as in the example shown, for controlling hydraulic machines with a single plunger piston, but is constructed—by the combination of two or several pipe connections—for controlling machines with a double plunger piston or with a differential piston, a corresponding protecting piston must be inserted before each packing piston collar, which has to pass a ring of openings.

What I do claim as my invention, and desire to secure by Letters Patent of the United States, is:—

1. In a controlling apparatus for hydraulic machines, the combination of a cylinder provided with openings through which liquid is adapted to flow to the hydraulic machine, a packing piston located within said cylinder and adapted to be brought into register with said openings to prevent the flow of liquid therethrough and a protecting piston also located within said cylinder and adapted to restrict the passage of liquid through said openings before the packing piston is brought into register therewith.

2. In a controlling apparatus for hydraulic machines, the combination of a cylinder provided with openings through which liquid is adapted to flow to the hydraulic machine, a packing piston located within said cylinder and adapted to be brought into register with said openings to prevent the flow of liquid therethrough, and a protecting piston movable with said packing piston and adapted to restrict the passage of liquid through said openings before the packing piston is brought into register therewith.

3. In a controlling apparatus for hydraulic machines, the combination of a cylinder provided with openings through which liquid is adapted to flow to the hydraulic machine, a reciprocable member located within said cylinder, a packing piston secured to said member and adapted to be brought into register with said openings to prevent the flow of liquid therethrough, a protecting piston also secured to said member and adapted to restrict the passage of liquid through said openings before the packing piston is brought into register therewith and means for reciprocating said member at will.

In testimony whereof I have hereunto set my hand in presence of two subscribing witnesses.

HUGO GILLE. [L. S.]

Witnesses:
HELEN NUFER,
FRANCES NUFER.